Patented May 16, 1950

2,507,731

UNITED STATES PATENT OFFICE 2,507,731

PROCESS OF REACTING PHOSPHORUS SULFIDE AND OLEFINIC HYDROCARBON

Lawson W. Mixon and Edward N. Roberts, Hammond, Ind., assignors to Standard Oil Company, Chicago, Ill., a corporation of Indiana No Drawing. Application October 17, 1947, Serial No. 780,578

16 Claims. (Cl. 260—139)

This invention relates to improvements in the preparation of phosphorus sulfide-hydrocarbon reaction products and more particularly relates to the preparation of neutralized reaction products of phosphorus sulfide and an aliphatic hydrocarbon having improved non-emulsifying properties.

The neutralized reaction products of a phosphorus sulfide and a hydrocarbon, such as are described in U. S. Patents 2,316,080, 2,316,082, 2,318,088 and 2,377,955 are very effective detergent-type additives used in combination with hydrocarbon oils, particularly petroleum lubricating oils. While these detergent-type additives are effective in inhibiting varnish formation and carbon deposition in and on vital parts of internal combustion engines, under certain conditions they may have a tendency to emulsify in the presence of small amounts of water.

It is an object of the present invention, therefore, to provide a method of preparing a neutralized phosphorus sulfide-aliphatic hydrocarbon reaction product which is resistant to emulsification. Another object of the invention is to provide an improved method of preparing the reaction product of a phosphorus sulfide and an olefinic hydrocarbon which will not readily emulsify with water. Still another object of the invention is to provide a method of preparing a neutralized sulfur and phosphorus-containing reaction product of a phosphorus sulfide and an aliphatic hydrocarbon which will not readily emulsify with water when in admixture with oil. A further object of the invention is to provide an improved method of preparing a neutralized phosphorus and sulfur-containing reaction product of a phosphorus sulfide and an olefin polymer which is resistant to emulsification in the presence of oil and water. A still further object of the invention is to provide an improved neutralized phosphorus and sulfur-containing reaction product of a phosphorus sulfide and an aliphatic hydrocarbon which is not readily emulsified. Other objects and advantages of the herein-described invention will become apparent from the following description thereof.

Heretofore, detergent type additives have been prepared by reacting a phosphorus sulfide, for example phosphorus pentasulfide, with a hydrocarbon at a temperature of from about 200° F. to about 500° F., using from about 1% to about 50% of the phosphorus sulfide and maintaining a non-oxidizing atmosphere above the reaction mixture. The reaction product is then neutralized with a suitable neutralizing agent, for example with an alkali metal hydroxide. As stated hereinbefore, the neutralized phosphorus sulfide-hydrocarbon reaction products are effective detergent type additives suitable for use in combination with internal combustion engine lubricating oils, but under certain conditions will promote emulsification of the lubricating oil with small amounts of water usually found in the crankcase.

We have discovered that neutralized phosphorus and sulfur-containing reaction products of a phosphorus sulfide and an aliphatic hydrocarbon which are resistant to emulsification are obtained by carrying out reaction in the presence of aromatic hydrocarbons. The aromatic hydrocarbon catalyst, which is used in amounts of from about 5% to about 100%, and preferably from 10% to about 50% by weight based on the aliphatic hydrocarbon reactant, can be a mono- or polynuclear aromatic hydrocarbon, such as benzene, naphthalene or anthracene, and preferably is a mono- or polyalkylated derivative of such aromatic hydrocarbons, in which the alkyl substituents contain from 1 to about 5 carbon atoms in each alkyl group. Examples of such aromatic hydrocarbons are the mono- or polyalkylated benzenes such as methylbenzene, dimethyl benzene, trimethyl benzene, tetramethyl benzene, dibutyl benzene, tripropyl benzene, tetrapropyl benzene, amyl benzene, or the mono- or polyalkylated polynuclear aromatic hydrocarbons, such as for example, methyl naphthalene, dimethyl naphthalene, trimethyl naphthalene, tetramethyl naphthalene, mono- and polybutyl naphthalenes, mono- and polymethyl anthracene, mono- and polypropyl anthracene, and methyl phenanthrene, and mixtures of such aromatics.

Aromatic hydrocarbons which we have found very well suited for the herein-described purpose are mixtures of aromatic hydrocarbons produced by the catalytic conversion of aliphatic and alicyclic hydrocarbons by the so-called hydroforming process. This mixture is known in the petroleum refining art as hydroformer polymer or bottoms. The hydroforming process by which the hydroformer polymer is obtained is described in U. S. 2,320,147. Briefly, the process comprises treating a virgin or cracked naphtha, or a mixture thereof, with a solid porous hydroforming catalyst such as an oxide of a metal of group 2 to 6 of the periodic system, and particularly an oxide of a group 6 metal, such as chromium or molybdenum suitably supported on alumina or magnesia. The conversion is suitably carried out at temperatures of from about 850° F.

to about 1050° F., and if desired, in the presence of hydrogen. The hydroformer reaction products are fractionated by taking overhead a catalytically reformed gasoline of suitable end point, and recovering a higher boiling material as bottoms which boil from about 400° F. to about 750° F. The bottoms referred to herein and in the appended claims as hydroformer polymer is a complex mixture of mono- and polycyclic aromatics. A typical vacuum distillation of a hydroformer sample having a gravity of about 12° API shows the following:

| Fraction | Component |
|---|---|
| 0-2% | Toluene. |
| 2-8% | Xylenes. |
| 8-14% | 1,3,5-Trimethylbenzene. |
| 14-17% | 1,3,4-Trimethylbenzene. |
| 17-22% | 1,2,3-Trimethylbenzene. |
| 22-27% | Tetramethylbenzene. |
| 27-37% | Naphthalene. |
| 37-50% | Monomethyl naphthalenes. |
| 50-61% | Diphenyl. |
| 61-74% | Dimethylnaphthalenes. |
| 74-78% | Methyldiphenyls. |
| 78-83% | Trimethylnaphthalenes. |
| 83-87% | Fluorene. |
| 87-89% | Methylfluorenes. |
| 89-94% | Anthracene and Phenanthrene. |
| 94-97% | Methylanthracenes and Methylphenanthrenes. |
| 97-98% | Pyrene. |
| 98-100% | Tetracyclics and higher. |

While we can use the entire hydroformer polymer, we prefer to use only the lighter fractions of the polymer, for example the 0% to 60%, and preferably the 0% to 40% fractions because the higher boiling aromatics are difficult to remove from the finished products by distillation or other suitable means.

In accordance with the present invention, the mixture of the aliphatic hydrocarbons, the aromatic hydrocarbons, phosphorus sulfide and a small amount of water is heated and agitated at a temperature of from about 100° F. to about 500° F., and preferably from about 300° F. to about 400° F., preferably in an inert atmosphere, such as nitrogen, until the reaction is completed. From about 1% to about 50%, and preferably from about 10% to about 20%, based on the aliphatic hydrocarbon, of the phosphorus sulfide is employed in the reaction. The amount of water used can vary from about 0.5 to about 3, and preferably from about 1 to about 2 mols per mol of phosphorus sulfide. It is advantageous, although not essential, to add small increments of elemental sulfur at stated intervals to the reaction mixture; usually from about 0.5% to about 3%, and preferably from about 1% to about 2% of sulfur has been found suitable. Upon completion of reaction, the reaction mass is diluted or thinned with mineral oil of suitable viscosity and the product neutralized at a temperature of from about 70° F. to about 600° F., and preferably from about 200° F. to about 400° F. with a neutralizing agent of the type hereinafter described. The neutralized reaction mixture is then steamed at a temperature of from about 200° F. to about 600° F., and preferably at about 400° F. until substantially all of the aromatic hydrocarbons used are eliminated from the reaction mass, although the presence of as much as 10% of the aromatic in the finished product is not detrimental. The steamed product may then be further diluted with a mineral oil of suitable viscosity and the product filtered while hot.

The phosphorus sulfide employed in the reaction can be any phosphorus sulfide, such as for example $P_2S_3$, $P_4S_3$, $P_4S_7$, $P_2S_5$, $P_4S_{10}$, etc., although we prefer to use $P_4S_{10}$ or $P_2S_5$.

The aliphatic hydrocarbon constituent of the reaction can be acyclic or alicyclic, although the former is preferred. The term "aliphatic hydrocarbon" as used herein and in the appended claims includes the acyclic and alicyclic hydrocarbons.

The aliphatic hydrocarbon constituent of this reaction is preferably a mono-olefin hydrocarbon polymer resulting from the polymerization of low molecular weight mono-olefinic hydrocarbons or isomono-olefinic hydrocarbons of from 2 to 6 carbon atoms, such as propylenes, butylenes, and amylenes or the copolymers obtained by the polymerization of hydrocarbon mixtures containing isomono-olefins and mono-olefins of less than 6 carbon atoms. The polymers may be obtained by the polymerization of these olefins or mixtures of olefins in the presence of a catalyst such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and isomono-olefin polymers having molecular weights ranging from about 150 to about 50,000 or more, and preferably from about 500 to about 10,000. Such polymers can be obtained for example, by the polymerization in the liquid phase of a hydrocarbon mixture containing mono-olefins and isomono-olefins such as butylene and isobutylene at a temperature of from about −80° F. to about 100° F. in the presence of a metal halide catalyst of the Friedel-Crafts type such as, for example, boron fluoride, aluminum chloride and the like. In the preparation of these polymers we may employ, for example, a hydrocarbon mixture containing isobutylene, butylenes and butanes recovered from petroleum gases, especially those gases produced in the cracking of petroleum oils in the manufacture of gasoline.

A suitable polymer for the reaction with phosphorus sulfide is the product obtained by polymerizing in the liquid phase a hydrocarbon mixture containing butylenes and isobutylenes together with butanes and some $C_3$ and $C_5$ hydrocarbons at a temperature between about 0° F. and 30° F. in the presence of aluminum chloride. A suitable method for carrying out the polymerization is to introduce the aluminum chloride into the reactor and introduce the hydrocarbon mixture, cooled to a temperature of about 0° F., into the bottom of the reactor and passing it upwardly through the catalyst layer while regulating the temperature within the reactor so that the polymer product leaving the top of the reactor is at a temperature of about 30° F. After separating the polymer from the catalyst sludge and unreacted hydrocarbons, the polymer is fractionated to obtain a fraction of the desired viscosity, such as for example, from about 100 seconds to about 4000 seconds Saybolt Universal at 210° F.

Another suitable polymer is that obtained by polymerizing in the liquid phase a hydrocarbon mixture comprising substantially $C_3$ hydrocarbons in the presence of an aluminum chloride complex catalyst. The catalyst is preferably prepared by heating aluminum chloride with isooctane. The temperature in the reactor is controlled within the range of about 50° F. to about 110° F. The hydrocarbon mixture is introduced into the bottom of the reactor and passed upwardly through the catalyst layer. The propane and other saturated gases pass through the catalyst while the propylene is polymerized under these conditions. The molecular weight of the propylene polymer is about 500 to about 1000.

Other suitable polymers can be obtained by polymerizing a hydrocarbon mixture containing about 10% to about 25% isobutylene at a temperature of from about 0° F. to about 100° F., and preferably 0° F. to about 32° F. in the presence of boron fluoride. After the polymerization of the isobutylene, together with a relatively minor amount of the normal olefins present, the reaction mass is neutralized, washed free of acidic substances and the unreacted hydrocarbons subsequently separated from the polymers by distillation. The polymer mixture so obtained, depending upon the temperature of reaction, varies in consistency from a light liquid to a viscous, oily material and contains polymers having molecular weights ranging from about 100 to about 2000, or higher. The polymers so obtained are fractionated under reduced pressure into fractions of increasing molecular weights, and suitable fractions are reacted with the phosphorus sulfide to obtain the desired reaction products. The bottoms resulting from the fractionation of the polymer which may have Saybolt Universal viscosities at 210° F., ranging from about 100 seconds to about 5000 seconds, are well suited for the purpose of the present invention.

Another source of an olefinic polymer suitable for the herein intended purpose is a fraction of the polymer obtained in the treatment of a gaseous hydrocarbon mixture containing isobutylene and normal butylenes in the presence of a phosphoric acid catalyst as in the synthesis of isooctane. The polymer may be obtained by subjecting a gas mixture comprising less than C6 hydrocarbons and containing C4 olefins and paraffins to temperatures of about 270° F. to about 430° F. preferably at about 300° F. to about 330° F. at pressures of from about 500 pounds per square inch to 750 pounds per square inch in the presence of a catalyst such as phosphoric acid. The mixed polymer obtained comprises essentially a dimer but contains in addition about 5–10% of heavy polymers comprising trimers, tetramers, and still higher polymers. This heavy polymer fraction may be fractionated to give about a 10–15% bottoms, which comprises essentially a tetramer fraction bottom boiling about 400° F. to 520° F.

Examples of high molecular weight olefinic hydrocarbons which can be employed as reactants are cetene (C16), cerotene (C26), melene (C30), and mixed high molecular weight alkenes obtained by cracking petroleum oils.

Other preferred olefins suitable for the preparation of the herein-described phosphorus sulfide reaction products are olefins having at least 20 carbon atoms in the molecule of which from about 13 carbon atoms to about 18 carbon atoms, and preferably at least 15 carbon atoms, are in a long chain. Such olefins can be obtained by the dehydrogenation of paraffins, such as by the cracking of paraffin waxes, or by the dehalogenation of alkyl halides, preferably long chain alkyl halides, particularly halogenated paraffin waxes. The olefins obtained by dehalogenation of long chain alkyl halides are preferably those obtained by dehalogenation of monohalogenated waxes, such as for example, those obtained by dechlorination of monochlor paraffin wax. The alkyl halides are decomposed to yield olefins according to the reaction $$C_nH_{2n+1}X \rightarrow C_nH_{2n} + HX$$

in which $n$ is a whole number, preferably 20 or more, and X is a halogen. It is preferred to employ paraffin waxes having at least about 20 carbon atoms per molecule and melting points upwards from about 90° F. to about 140° F.

To obtain the halogenated paraffin wax, for example chlorinated paraffin wax, chlorine is introduced into the wax, maintained in a molten state, until the wax has a chlorine content of from about 8% to about 15%. The chlorinated wax product is a mixture of unchlorinated wax, monochlor wax and polychlor wax. This chlorinated product may be used as such, but it is advantageous to use the substantially monochlor wax fraction. The monochlor wax fraction can be segregated from the unchlorinated wax and the polychlor wax fractions by taking advantage of the differences in the melting points of the various fractions, since the melting point of the wax varies with the extent of chlorination, i. e., the melting point of the unchlorinated wax is greater than that of the monochlor wax, and the melting point of the latter is greater than that of the polychlor wax. Thus, the monochlor paraffin wax can be separated from the unchlorinated and the polychlor wax fractions by means such as sweating, fractional distillation, solvent extraction, solvent precipitation, and fractional crystallization.

The high molecular weight olefins are obtained by removing the halogen as hydrogen halide from the halogenated paraffin wax. For example, the corresponding olefin is obtained from the monochlor paraffin wax by removing the chlorine from the latter as hydrogen chloride. The monochlor wax can be dechlorinated by heating to a temperature of from about 200° F. to about 600° F. in the presence of a dechlorinating agent, such as an alkali metal hydroxide or an alkaline earth metal hydroxide or oxide. Other alkaline inorganic or organic materials can also be used. The chlorine can also be removed from the chlorowax by heating the same for a prolonged period in the absence of any dechlorinating agent. After the dehalogenation has been completed the olefin so obtained can be further purified by removing the dehalogenating agent by means of filtration or by other suitable means.

As a starting material there can be used the polymer or synthetic lubricating oil obtained by polymerizing unsaturated hydrocarbons resulting from the vapor phase cracking of paraffin waxes in the presence of aluminum chloride which is fully described in United States Patents Nos. 1,995,260, 1,970,002 and 2,091,398. Still another type of olefin polymer which may be employed is the polymer resulting from the treatment of vapor phase cracked gasoline and/or gasoline fractions with sulfuric acid or solid absorbents, such as fuller's earth, whereby unsaturated polymerized hydrocarbons are removed. Also contemplated within the scope of this invention is the treatment with phosphorus sulfide of the polymers resulting from the voltolization of hydrocarbons as described, for example in United States Patents Nos. 2,197,768 and 2,191,787.

Also contemplated within the scope of the present invention are the reaction products of a phosphorus sulfide with essentially paraffinic hydrocarbons, such as bright stock residuums, lubricating oil distillates, petrolatums and paraffin waxes and the reaction products of a phosphorus sulfide and an alicyclic hydrocarbon, such as a terpene.

Neutralization of the phosphorus sulfide-hydrocarbon reaction product can be effected by treating the reaction product at a temperature within the range of from about 70° F. to about 500° F. with a suitable basic compound, such as a hydroxide, carbonate, sulfide or an oxide of an alkaline earth metal or an alkali metal such as for example, potassium hydroxide, sodium hydroxide, sodium sulfide, potassium sulfide, calcium hydroxide, calcium sulfide, etc. Other basic reagents can be used such as for example, ammonia or an alkyl or aryl substitute of ammonia such as an amine. The neutralization of the phosphorus sulfide-hydrocarbon reaction product is carried out preferably in a non-oxidizing atmosphere by contacting the reaction product either as such or dissolved in a suitable solvent such as a light mineral oil with a solution of the basic reagent, for example potassium hydroxide, sodium hydroxide, sodium sulfide, etc. As an alternative method, the reaction product can be treated with solid alkaline compounds, such as KOH, NaOH, $Na_2CO_3$, $KHCO_3$, $K_2CO_3$, CaO, and the like at an elevated temperature of from about 100° F. to about 600° F. As was aforesaid, when the phosphorus sulfide-hydrocarbon reaction product is neutralized with a basic reagent containing a metal constituent, the neutralized reaction product is characterized by the presence of the metal constituent of the basic reagent. Neutralized reaction products containing a heavy metal constituent, such as for example, tin, titanium, aluminum, chromium, cobalt, zinc, iron and the like, can be obtained by reacting a salt of the desired heavy metal with the phosphorus sulfide-hydrocarbon reaction product which has been treated with a basic reagent. It will be understood that when the neutralization is accomplished with a polyvalent basic material such as lime, a product having excess basicity may be obtained. The neutralized reaction product obtained by the herein-described method contains sulfur, phosphorus and the metal ion of the neutralizing agent.

The following examples which are given to illustrate the herein-described invention are not intended to limit the scope thereof.

*Example I*

A mixture of 200 parts butylene polymers (Saybolt Universal viscosity at 210° F. — 1050 seconds — flash 370° F.), 115 parts of the 40% to 80% cut of hydroformer polymer and 44 parts of $P_4S_{10}.H_2O$ were heated with stirring at 400° F. under an atmosphere of nitrogen for six hours. During this time a total of 4.9 parts of sulfur were added in five equal dumps at hourly intervals. 119 parts of a 10 SAE grade mineral oil were then added and the product neutralized by slow addition at 400° F. of a solution of 27.7 parts of KOH in an equal weight of water. The reaction mixture was then steamed for one hour at 400° F., 82 parts of a 10 SAE grade mineral oil added, and the product filtered while hot through celite.

*Example II*

This product was prepared similarly to that of Example I with the exception that 58 parts of the 40% to 80% cut of hydroformer polymer was used.

*Example III*

This product was prepared similarly to that of Example I with the exception that 34 parts of the 40% to 80% cut of the hydroformer polymer was used.

*Example IV*

This product was prepared similarly to that of Example I with the exception that 17 parts of the 40% to 80% cut of hydroformer polymer was used.

*Example V*

This product was prepared similarly to that of Example II with the exception that a 0% to 20% cut of the hydroformer polymer was used.

*Example VI*

This product was prepared similarly to that of Example II with the exception that a 20% to 40% cut of the hydroformer polymer was used.

*Example VII*

This product was prepared similarly to that of Example II with the exception that a 40% to 60% cut of the hydroformer polymer was used.

*Example VIII*

This product was prepared similarly to that of Example II with the exception that a 0% to 40% cut of the hydroformer polymer was used.

*Example IX*

This product was prepared similarly to the product of Example II with the exception that a mixture of 1,3,5 and 1,2,4 trimethyl benzene was used.

*Example X*

This product was prepared similarly to that of Example II with the exception that 1,2,3-trimethyl benzene was used.

*Example XI*

This product was prepared similarly to that of Example II with the exception that tetramethyl benzene was used.

*Example XII*

This product was prepared similarly to that of Example II with the exception that a mixture of tetramethyl and pentamethyl benzenes was used.

*Example XIII*

This product was prepared similarly to that of Example II with the exception that methyl naphthalene was used.

A control oil, the control oil with a conventionally prepared neutralized butylene polymer-$P_2S_5$ reaction product and the products of Examples I to XIII, inclusive in the control were tested for their demulsibility characteristics by subjecting them to the following test:

Twenty-five milliliters of liquid paraffin mineral oil containing 0.75% of 100% additive and 25 ml. of distilled water are placed in a chemically clean tall cylinder and heated in a water bath to 180° F., place in an insulated box and shaken on the shaking machine at 140 strokes per minute for two minutes, removed from the shaking machine and allowed to remain quiescent for 1½ hours at 180° F. At the end of the time, the samples are examined for evidence of emulsification and are rated as follows:

A sample substantially equivalent to the control oil, a liquid paraffin mineral oil, and considered perfect, was rate 1; a sample having a slight haze and/or rag at the interface is considered good and rated 2; a sample having a heavy haze and rag at the interface was considered poor and rated 3; a sample which was thickly emulsified was considered bad and rated 4. The results obtained by subjecting Samples I to XIII, inclusive to the above test are tabulated in Table I.

*Table I*

|  | Demulsibility rating |
|---|---|
| Control oil | 1 |
| Control+.75% conventional neutralized butylene polymer (1000 M. W.)-$P_2S_5$-reaction product | 4 |
| Control+.75% product of Example I | 1-2 |
| Control+.75% product of Example II | 1-2 |
| Control+.75% product of Example III | 2 |
| Control+.75% product of Example IV | 3 |
| Control+.75% product of Example V | 1-2 |
| Control+.75% product of Example VI | 1 |
| Control+.75% product of Example VII | 1-2 |
| Control+.75% product of Example VIII | 1-2 |
| Control+.75% product of Example IX | 2-3 |
| Control+.75% product of Example X | 2 |
| Control+.75% product of Example XI | 1-2 |
| Control+.75% product of Example XII | 1-2 |
| Control+.75% product of Example XIII | 1-2 |

As demonstrated by the data in the above table, the neutralized phosphorus sulfide-aliphatic hydrocarbon product prepared in the presence of the aromatic hydrocarbon when added to a lubricating oil does not cause emulsification as do the conventional neutralized phosphorus sulfide-aliphatic hydrocarbon reaction product.

While the herein described method of preparing the neutralized reaction product of a phosphorus sulfide and an aliphatic hydrocarbon, for example butylene polymers, markedly improves the emulsifying resisting property of the product, the other desired properties are not deleteriously affected. This is demonstrated by the data in Table II, in which are tabulated the results of engine tests on oils containing neutralized phosphorus sulfide-butylene polymer reaction products prepared in accordance with the present invention, and by the conventional method. The test was the so-called "36 hour Chevrolet test" made in accordance with the Cooperative Research Council test procedure "C. R. C. Designation L-4-243" of February 1943. This test is made in a six-cylinder spark-ignition internal combustion engine equipped with two copper-lead alloy bearings and operated at about 3150 R. P. M. with an oil temperature of 280° F.±2° F. At the end of the 36 hour test period the engine is dismantled and the interior examined for varnish and sludge, and the copper-lead alloy bearings weighed to determine the amount of corrosion.

The following oils were used in the tests:

*Oil A.*—A SAE 30 motor oil base+0.75% (wt.) of a KOH neutralized reaction product of $P_2S_5$ and a butylene polymer of about 1000 molecular weight prepared in accordance with the present invention with a hydroformer polymer fraction.

*Oil B.*—A SAE 30 motor oil base+0.75% (wt.) of a KOH neutralized reaction product of $P_2S_5$ and a butylene polymer of about 100 molecular weight prepared by prior conventional method.

Each of the above also contained 0.25% (wt.) of a sulfurized mineral oil and 0.5% (wt.) of a sulfurized terpene, as corrosion inhibitors.

*Table II*

|  | Oil A | Oil B |
|---|---|---|
| Varnish | 9.2 | 9.1 |
| Overall varnish | 48.7 | 41.9 |
| Overall sludge | 46.6 | 47.9 |
| Total (SAE rating) | 95.3 | 89.6 |
| Bearing Corrosion [1] | 0.09 | 0.14 |
|  | 0.10 | 0.09 |

[1] Loss in grams per bearing.

The above data show that the neutralized reaction products of a phosphorus sulfide and a hydrocarbon prepared in accordance with the herein-described invention are effective detergent-type lubricating oil additives.

The phosphorus and sulfur-containing neutralized phosphorus sulfide-aliphatic hydrocarbon reaction products prepared in accordance with the herein-described invention are suitably employed in amounts of from about 0.001% to about 10%, and preferably from about 0.01% to about 3.0% by weight, in lubricant compositions in combination with hydrocarbon oils, such as petroleum oils or synthetic oils. The reaction products can also be compounded with a suitable oil in the form of a concentrate containing from about 10% to about 50% or more of additive. The concentrate can be used for blending with a hydrocarbon oil or other oil in the proportions desired for the particular conditions of use. The product of the present invention can also be used in fuel oils, insulating oils, turbine oils, synthetic hydrocarbon oils, waxes, greases, non-drying animal, vegetable or marine oils, etc.

The product of the present invention can be used in lubricants in combination with other additives such as for example, corrosion inhibitors, metal deactivators, E. P. agents, antioxidants, pourpoint depressants, anti-foam agents, etc.

Percentages given herein are weight percentages.

While we have described our invention with reference to certain preferred embodiments thereof, it is to be understood that the invention is not limited to the preferred modifications or to the specific examples given, but includes within its scope such modifications as come within the spirit of the appended claims.

We claim:

1. In the process of preparing a neutralized reaction product of a phosphorus sulfide and an olefinic hydrocarbon having a molecular weight of at least about 150 in which the olefinic hydrocarbon is reacted with from about 1% to about 50% of a phosphorus sulfide at a temperature of from about 100° F., to 500° F., and the resultant reaction product neutralized, the improvement comprising carrying out the reaction in the presence of from about 5% to about 100% by weight, based on the olefinic hydrocarbon, of an aromatic hydrocarbon.

2. In the process of preparing a neutralized reaction product of a phosphorus sulfide and an olefin hydrocarbon having a molecular weight of at least about 150 in which the olefinic hydrocarbon is reacted with from about 1% to about 50% of a phosphorus sulfide at a temperature of from about 100° F. to about 500° F., and the resultant reaction product neutralized, the improvement comprising carrying out the reaction and neutralization in the presence of from about 5% to about 100%, by weight, based on the olefinic hydrocarbon reactant, of an aromatic hydrocarbon, and from about ½ to about 3 mols of water per mol of phosphorus sulfide.

3. The process comprising reacting from about 1% to about 50% of a phosphorus sulfide with an olefin hydrocarbon having a molecular weight of at least about 150 at a temperature of from about 100° F. to about 500° F., in the presence of from about 5% to about 100%, by weight, based on the olefinic hydrocarbon reactant, of an aromatic hydrocarbon, and from about ½ to about 3 mols of water per mol of phosphorus sulfide, neutralizing the resultant reaction product with a basic reagent, at a temperature of from about 70° F. to about 600° F., and subsequently removing said aromatic hydrocarbon from the neutralized reaction product.

4. The process comprising reacting a monoolefin hydrocarbon polymer having a molecular weight of at least about 150 with from about 1% to about 50% of a phosphorus sulfide at a temperature of from about 100° F. to about 500° F. in the presence of from about ½ to about 3 mols of water per mol of phosphorus sulfide, and from about 5% to about 100%, by weight, based on the monoolefin hydrocarbon polymer, of an aromatic hydrocarbon, neutralizing the resultant reaction product with a basic reagent at a temperature of from about 70° F. to about 600° F., steaming the neutralized reaction product at a temperature of from about 200° F. to about 600° F., and removing said aromatic hydrocarbon from the neutralized reaction product.

5. The process of claim 4 in which the aromatic hydrocarbon is a catalytic reformed naphtha fraction having an ASTM distillation range between about 400° F. and about 750° F., and comprising predominantly a mixture of mono- and polycylic aromatic hydrocarbons.

6. The process of claim 4 in which the aromatic hydrocarbon is a 0% to 40% fraction of a catalytic reformed naphtha fraction having an ASTM distillation range of from about 400° F. to about 750° F., and comprising predominantly mono- and polycyclic aromatic hydrocarbons.

7. The process of claim 4 in which the aromatic hydrocarbon is a methylated aromatic hydrocarbon.

8. The process of claim 4 in which the monoolefin polymer has a molecular weight of at least about 500.

9. The process of claim 4 in which the monoolefin polymer is a propylene polymer.

10. The process of claim 4 in which the monoolefin polymer is a butylene polymer.

11. The process of claim 4 in which the phosphorus sulfide is $P_4S_{10}$.

12. The process of claim 4 in which the basic reagent is a basic alkali metal compound.

13. The process of claim 4 in which the basic reagent is sodium sulfide.

14. The process of claim 4 in which the basic reagent is potassium hydroxide.

15. The process of claim 4 in which the basic reagent is a basic alkaline earth compound.

16. The process of claim 4 in which the basic reagent is calcium oxide.

LAWSON W. MIXON.
EDWARD N. ROBERTS.

REFERENCES CITED

The following references are of record in the file of this patent:

UNITED STATES PATENTS

| Number | Name | Date |
| --- | --- | --- |
| 2,076,875 | Borglin et al. | Apr. 13, 1937 |
| 2,315,529 | Kelso | Apr. 6, 1943 |
| 2,316,082 | Loane | Apr. 6, 1943 |
| 2,316,086 | MacLaren | Apr. 6, 1943 |
| 2,316,090 | Kelso et al. | Apr. 6, 1943 |
| 2,367,468 | Mixon et al. | Jan. 16, 1945 |